United States Patent [19]

Caldwell

[11] Patent Number: 4,511,590
[45] Date of Patent: Apr. 16, 1985

[54] LOW-LACTOSE, LOW-GALACTOSE IMITATION MILK PRODUCT

[76] Inventor: Marion J. Caldwell, 510 Palo Verde Dr., Leesburg, Fla. 32748

[21] Appl. No.: 495,441

[22] Filed: May 17, 1983

Related U.S. Application Data

[63] Continuation-in-part of Ser. No. 303,043, Sep. 17, 1981, abandoned.

[51] Int. Cl.³ .............................. A23C 9/00; A23C 9/15
[52] U.S. Cl. .................................... 426/580; 426/582; 426/613; 426/585; 426/602
[58] Field of Search ................ 426/580, 582, 613, 585, 426/602

[56] References Cited

U.S. PATENT DOCUMENTS

| | | | |
|---|---|---|---|
| 1,190,369 | 7/1916 | Beckman et al. | 426/585 |
| 2,604,403 | 7/1952 | Wiechers | 426/585 |
| 2,682,467 | 1/1954 | Brereton et al. | 426/580 |
| 2,703,285 | 3/1955 | Luther | 426/585 |
| 2,923,628 | 2/1960 | Otto | 426/585 |
| 2,998,315 | 8/1961 | Peebles et al. | 426/580 |
| 3,218,173 | 11/1965 | Lowenstein | 426/580 |

*Primary Examiner*—Jeanette Hunter
*Attorney, Agent, or Firm*—Lockwood, Alex, FitzGibbon & Cummings

[57] ABSTRACT

A low-lactose, low-galactose imitation milk which, in addition to added water content, is comprised of a major portion of undenatured, washed and drained curds of cottage cheese plus minor proportions of edible oils or fats (e.g. corn oil), an emulsifying and/or stabilizing agent (e.g. lecithin), a source of nutritional calcium (e.g. precipitated calcium carbonate) and a sweetener other than lactose or galactose (e.g. sucrose). Salt, flavoring agents, vitamins and minerals may be incorporated to meet preferences and nutritional requirements. The undenatured, washed and drained cottage cheese will provide, in the finished product, no more than about 10% of the lactose found in cow's milk and little or no free galactose. The imitation milk product is particularly useful to persons who have lactose or galactose intolerance.

13 Claims, No Drawings

LOW-LACTOSE, LOW-GALACTOSE IMITATION MILK PRODUCT

This application is a continuation-in-part of my co-pending application Serial No. 06/303,043 filed Sept. 17, 1981 now abandoned.

This invention relates to a low-lactose, low-galactose imitation or artifical milk dairy product which is highly palatable and is a close nutritional equivalent of cow's milk, and which fills the demands of a large number of persons who cannot tolerate cow's milk because of its lactose content. Further, it meets the demands of those persons who must restrict their cholesterol and saturated fatty-acid intake, and those who may be sensitive to galactose resulting from the digestion of the lactose of cow's milk. More specifically, my invention relates to a low-lactose, low-galactose (or galactose precursor) artificial milk dairy product which, in addition to its water content, is comprised of a major portion of the washed and drained curds of freshly made cottage cheese, before creaming, plus minor proportions of edible oil or fat (e.g. corn oil), an emulsifying and/or stabilizing agent (e.g. soybean lecithin), a source of nutritional calcium (preferably precipitated calcium carbonate) and a non-lactose, non-galactose sweetener. Salt, flavoring agents, minerals and vitamins may be added as desired to impart additional nutritional and palatability properties.

Providing proper nutrition involves more than making available products that will furnish the essential components of a well balanced diet. For example, soybean oil meal is an excellent source of protein and is a primary source of protein in livestock feeds. However, soybean oil meal is not widely accepted as a major source of protein in human diets. On the other hand, milk protein (casein) is widely accepted, and traditionally milk has provided a primary source of protein in many cultures. However, it is well known and documented that a large number of persons, estimated at about 25% of the adult American population, have a lactose-intolerance (milk-sugar intolerance) which makes cow's milk unacceptable as a food. In such persons, even moderate intake of milk may result in untoward effects including diarrhea, flatuence, cramps or other intestinal disorders. This lactose-intolerance is ascribed to a sharp post-weaning decrease in the amount of lactase enzyme from the digestive system of these persons, and their consequent inability to digest milk-sugar, which constitutes over 50% of the dry matter of skim-milk. Human infants are seldom, if ever, deficient in the lactase enzyme and are, with few exceptions (i.e. Galactosemic infants), able to obtain their major nutritional needs from milk without difficulty.

Not so well known as the lactose intolerance findings, are the recent findings that associate the development of some human and animal cataracts with the intake of the sugar galactose or its precursor lactose. (*British J. of Ophthalomogy.* 1982, 66, 438–441); (*Digestive Diseases and Sciences,* Vol. 27, No. 3, 257–264, March 1982). Reduced levels of the enzyme galactokinase, which is involved in the conversion of galactose to glucose, is a probable factor in the development of galactose cataracts. It should be pointed out that some of the "low lactose" milk products on the market (e.g. lactase enzyme milks) do not address this problem; rather, they simply convert the lactose to galactose and glucose. It is well known that the unique value of milk in adult nutrition is in its calcium, protein and vitamin content, not in its sugar content.

In accordance with the present invention, I have discovered a low-lactose, low-galactose imitation milk product and method of making this new product. The nutritional and palatability characteristics of the product are sufficiently close to those of cow's milk to be acceptable as a replacement by persons intolerant of lactose and/or galactose. Since, undenatured, washed and drained curds of cottage cheese are a major ingredient of my new product and, preferably, provide all of its protein, it can be classified as a dairy product.

The object of my invention, generally stated, is the provision of a low-lactose, low-galactose (or galactose precursor) milk-substitute dairy product, which is the nutritional equivalent of cow's milk in essential respects and which resembles cow's milk sufficiently to be acceptable as a drink and in the usual culinary uses, and an economic substitute for cow's milk especially for those individuals who cannot tolerate the levels of lactose (galactose precursor) present in cow's milk or the levels of galactose present in so-called "enzyme milks".

A more specific object of this invention is the provision of such a low-lactose, low-galactose milk-substitute dairy product which, in addition to its added water content, is formulated from a major proportion of undenatured, washed and drained curds of sweet cottage cheese (before "creaming") and from minor proportions of edible oil or fat, an emulsifying or stabilizing agent to serve as a suspending agent, a finely divided source of nutritional calcium, a sweetener other than lactose or galactose, and additional flavoring agents and vitamins, as desired.

A further object of the invention is a practical method of making the low-lactose, low-galactose imitation milk product provided by the invention.

It should be noted that in the cottage cheese process, although small amounts of rennin may or may not be used, the milk casein is precipitated at its own isoelectric point by gradual development of acidity by the lactic acid producing bacteria. Accordingly, there is little denaturation and the natural taste is largely preserved. About 90% of the lactose content of the milk is discarded with the whey and washings, at which stage the washed, drained curds are ready for processing in accordance with my invention.

For a more completely understanding of the invention and the best embodiment known to me at this time, reference may now be had to the following general and preferred formulations, and working examples.

| General Formulation | Parts By Weight |
| --- | --- |
| Undenatured, washed and drained curds from cottage cheese process | 120 to 180 |
| Edible fat or oil | 10 to 50 |
| Source of Nutritional calcium | q.s. |
| Stabilizer or emulsifier | 0 to q.s. |
| Salt (sodium chloride or salt substitute) | 0 to q.s. |
| Flavoring agent(s) | 0 to q.s. |
| Non-lactose/non-galactose sweetener | q.s. |
| Vitamin mix (commercial product) | 0 to q.s. |
| Water (to make up to 1000 parts) | q.s. |
| | 1000 parts |

The edible fat or oil content depends on the desired fat-content of the imitation milk product. Thus, 20 parts by weight of edible fat or oil corresponds to 2% fat-content in the ready-to-drink product.

| Preferred General Formulation | Parts By Weight |
|---|---|
| Undenatured, washed and drained curds from cottage cheese process | 140 to 160 |
| Vegetable Oil | 10 to 50 |
| Lecithin (stabilizer or emulsifier) | 1 to 5 |
| Salt (sodium chloride or salt substitute) | 1.3 to 1.7 |
| Precipitated calcium carbonate (can be partially replaced) | 2.0 to 3.0 |
| Sweetener other than lactose or galactose | q.s. |
| Butter flavor | q.s. |
| Vitamin Mixture | q.s. |
| Water (to make 1000 parts) | q.s. |
| | 1000 parts |

Lecithin is the stabilizer or emulsifier of choice and preferably is used in an amount equal to one-tenth the amount of vegetable oil.

From the foregoing General Formulation, it will be seen that the essential ingredients of the low-lactose, low-galactose imitation milk compositions are undenatured, washed and drained curds from the cottage cheese process, edible fat or oil, a source of nutritional calcium, non-lactose/non-galactose sweetener, and added water. From the foregoing Preferred General Formulation, it will be seen that in addition to the essential ingredients of the General Formulation, there are included lecithin, salt or salt substitute, butter flavor and a suitable vitamin mixture. Of the foregoing ingredients other than water, the washed and drained cottage cheese curds constitute the major ingredient in the compositions, and provide all of the protein.

The undenatured, washed and drained curds from a conventional cottage cheese product constitute an essential ingredient of the compositions of my invention which is important from several standpoints. They should be of a sweet bland flavor with minimum acidity. In addition to providing the protein (i.e. casein) that is naturally present in cow's milk, the undenatured, washed and drained cottage cheese makes a major contribution toward imparting to the artificial milk products of this invention palatability characteristics similar to those associated with cow's milk. In general, any of the well-known procedures for making the so-called sweet cottage cheese of commerce may be used omitting, however, the so-called "creaming" step wherein cream is blended with the washed and drained cottage cheese curds at the end of the process. As previously noted, about 90% of the lactose content of the starting material (i.e. freshly pasteurized skim milk) will be removed or lost in the whey and washings in the cottage cheese manufacturing process. Since lactose is the precursor of galactose, removal of the lactose also removes the source of galactose.

With respect to the edible fat or oil components of my composition, generally speaking, any of the common edible vegetable oils or mixtures of them may be used, provided they are compatible and do not detract from texture and/or palatability. Preferably, the edible oil will enhance the texture and palatability. From the standpoints of nutrition and cost, I prefer to use a high grade edible vegetable oil such as corn oil, cottonseed oil, peanut oil or safflower oil. These vegetable oils are low in saturated fats and contain no cholesterol. However, butter fat in the form of cream or butter can also be used as well as bland deodorized animal fat and hydrogenated vegetable oils if saturated fat and chlolesterol reduction is not an objective. Regardless of the kind of oil or fat used, from five to ten percent of lecithin should be dissolved in the oil or fat prior to its addition to the other ingredients, as an emulsifying agent and to impart a creamy taste.

As stated above, my compositions include a source of nutritional calcium as an essential ingredient. Precipitated calcium carbonate is the calcium source of choice. It is low in cost, readily available and contributes to the nutrient value of the imitation milk products. However, it can be replaced in part by tricalcium phosphate or other edible calcium salt if desired.

A sweetener (other than lactose or galactose) is an essential constituent of my compositions from the standpoint of palatability. Sucrose serves as an excellent sweetener. However, other commercial sweeteners such as dextrose, fructose or corn syrup may be used. In the interest of minimizing calorie content and meeting the demands of diabetics, an artificial sweetener such as saccharin may be used.

In my preferred formulations, I also include, as a suspending agent, a stabilizer or emulsifier (preferably lecithin), salt or a salt substitute, butter flavor, and vitamins in the form of commercially available vitamin mixtures.

The following specific examples may be followed in practicing my invention:

| EXAMPLE I. Laboratory or Kitchen Size Batch | |
|---|---|
| Place the following ingredients in a quart size high-speed kitchen blender: | |
| Washed and drained curds of cottage cheese | 275 grams (1¼ cups) |
| Calcium Carbonate, precipitated, very fine | 6 grams (2 tsp.) |
| Salt (Sodium Chloride or salt substitute) | 3 grams (½ tsp.) |
| Table Sugar (Sucrose) | 24 grams (2 Tbsp.) |
| Butter Flavor (French's or other) | 0.5 grams (⅛ tsp.) |
| Water | 340 grams (1½ cups) |
| Blend these ingredients to a creamy consistency, and while still blending at high speed, add a fluid mixture (Solution) consisting of: | |
| Corn Oil | 50 grams (2-fl.oz.) |
| Liquid soybean lecithin | 5 grams (1 tsp.) |
| Transfer the homogenized creamy product to a 2-quart container, allow bubbles to clear, and add water to the 2-quart mark (1900 grams). Mix. Use as whole milk. | |

The low-lactose, low-galactose imitation milk products of the present invention may be readily produced in batches of various sizes ranging from laboratory size batches as illustrated by Example 1 up to commercial dairy-sized batches. The following example will serve as an example of a one-thousand pound batch:

| EXAMPLE II. One Thousand Pound Batch | |
|---|---|
| Washed and drained curds from cottage cheese process | 150 lbs. |
| Calcium Carbonate, precipitated, very fine | 3 lbs. |
| Salt (Sodium Chloride) | 1.5 lbs. |
| Table Sugar (Sucrose) | 12.5 lbs. |
| Butter Flavor (Commercial product) | 0.25 lbs. |
| Vitamin Mixture (Commercial product) | q.s. |
| Water | 200 lbs. |
| Mixture or solution of: | |
| Corn Oil | 25 lbs. |

-continued

| EXAMPLE II. One Thousand Pound Batch | |
|---|---|
| Liquid Soybean lecithin | 2.5 lbs. |
| Water (final addition to 1000 lb. weight) | q.s. |
| Total | 1000 lbs. |

The procedure of Example I can be followed, in general, but with production equipment for blending and homogenizing scaled to the larger batch size. For increased stabilization of the commercial product, a high pressure homogenizer of known commercial type may be used as a final process prior to bottling the product for distribution.

Instead of making the final water addition, the concentrated creamy mix may be spray-dried using equipment and procedures well-known in the art to produce a dried powder product to which water may be added at time of use. In a similar manner, prior to the final water addition, the concentrated product may be canned and sterilized as a commercial product.

The product made essentially as described in Example I has been consumed on a daily basis for over 30 months, with no manifestation of the above-mentioned untoward effects associated with cow's milk. Furthermore, the palatability and satisfaction level has remained high at all times. It is routinely used in all ways that cow's milk is used in food and in the preparation of foods.

I claim:

1. A low-lactose, low-galactose imitation milk product for human consumption wherein the essential ingredients other than added water are: a major quantity of from about 12% to about 18% by weight of undenatured, washed and drained cottage cheese curds; from about 1.0% to about 5.0% by weight of an edible fat or oil; a minor quantity of a substance providing nutritional calcium; a minor quantity of a suspending substance that serves as a stabilizer or emulsifier in the presence of added water; a minor quantity of a sweetener other than lactose or galactose; and a minor quantity of at least one additional palatability-imparting substance.

2. The imitation milk product of claim 1 wherein said suspending substance is lecithin.

3. The imitation milk product of claim 1 wherein said edible fat or oil is a vegetable oil of the group consisting of corn oil, cottonseed oil, peanut oil and safflower oil, or mixtures of these.

4. The imitation milk product of claim 1 wherein said substance providing nutritional calcium is precipitated calcium carbonate.

5. The imitation milk product of claim 1 wherein salt and butter flavor are present as additional palatabilty-imparting substances.

6. The imitation milk product of claim 1 fortified with vitamins to approximately whole milk levels.

7. The imitation milk product of claim 1 in spray-dried form.

8. The imitation milk product of claim 1 in concentrated form.

9. A low-lactose, low-galactose imitation milk product for human consumption wherein the essential ingredients other than added water are: a major quantity of from about 12% to about 18% by weight of undenatured, washed and drained cottage cheese curds; from about 1.0% to about 5.0% by weight of an edible fat or oil; from about 0.1% to about 0.5% by weight of lecithin; from about 0.1% to about 0.2% by weight of salt; from about 0.2% to about 0.4% by weight of precipitated calcium carbonate; a minor quantity of a sweetener other than lactose or galactose; a minor quantity of butter flavor; and a fortifying quantity of vitamins.

10. A low-lactose, low-galactose imitation milk product for human consumption wherein the essential ingredients other than added water are: approximately 275 parts by weight of undenatured, washed and drained cottage cheese curds; approximately 6 parts by weight of precipitated calcium carbonate; approximately 3 parts by weight of salt or a salt substitute; approximately 50 parts by weight of corn oil; approximately 5 parts by weight of liquid soybean lecithin; approximately 24 parts by weight of sucrose; approximately 0.5 parts by weight of butter flavor; and enough added water to bring the total parts by weight to approximately 1900.

11. A low-lactose, low-galactose imitation milk product for human consumption wherein the essential ingredients other than added water are: approximately 150 parts by weight of undenatured, washed and drained cottage cheese curds; approximately 3.0 parts by weight of precipitated calcium carbonate; approximately 1.5 parts by weight of salt or a salt substitute; approximately 25 parts by weight of corn oil; approximately 2.5 parts by weight of liquid soybean lecithin; approximately 12.5 parts by weight of sucrose; approximately 0.25 parts by weight of butter flavor; and enough added water to bring the total parts by weight to approximately 1000.

12. The method of preparing a low-lactose, low-galactose imitation milk product which comprises, forming a blend of major proportions of water and undenatured, washed and drained cottage cheese curds and minor proportions of precipitated calcium carbonate, salt, a sweetener other than lactose or galactose, and a commercial butter flavor; then adding to the blending mixture a solution of lecithin in vegetable oil and continuing the high speed blending until the oil is homogenized into the whole mixture, water is then added to bring to the proper volume, and mixed.

13. A low-lactose, low-galactose imitation milk product for human consumption wherein the essential ingredients other than added water are: undenatured, washed and drained cottage chesse curds which provide the primary source of nutritional protein and contain no more than about 10% of the original lactose content of the milk from which said curds were derived; an edible fat or oil; a substance providing nutritional calcium; a suspending substance that serves as a stabilizer or emulsifier in the presence of added water; a sweetner other than lactose or galactose; and, at least one additional palatability-imparting substance; on the basis of the combined weights of all said essential ingredients, said cottage cheese curds constituting the major proportion of said combined weights.

* * * * *